UNITED STATES PATENT OFFICE.

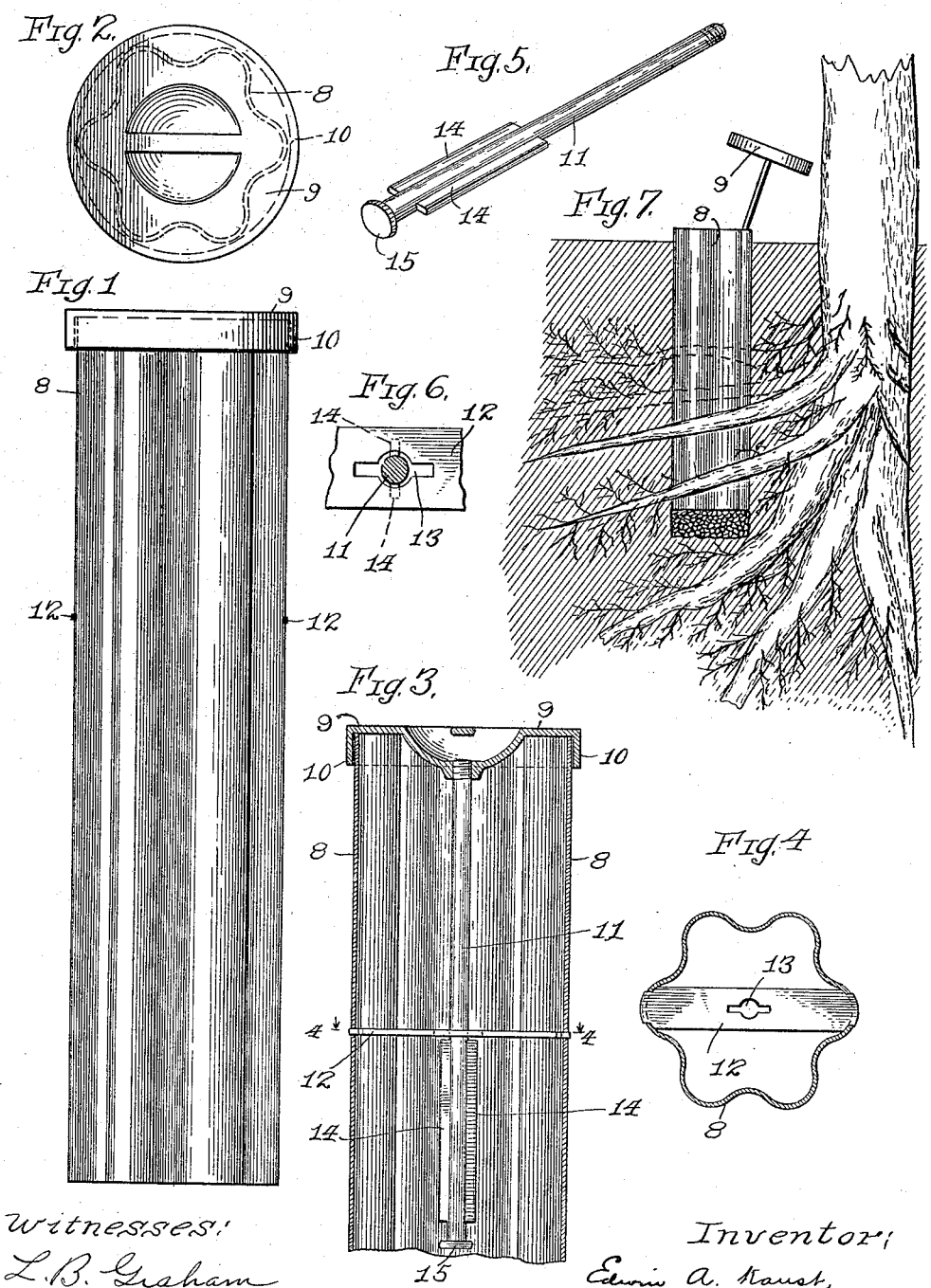

EDWIN A. KANST, OF CHICAGO, ILLINOIS.

TREE-IRRIGATOR.

1,194,027.  Specification of Letters Patent.  Patented Aug. 8, 1916.

Application filed March 2, 1914. Serial No. 821,987.

*To all whom it may concern:*

Be it known that I, EDWIN A. KANST, a citizen of the United States, residing at Chicago, in the county of Cook and State of Illinois, have invented certain new and useful Improvements in Tree-Irrigators, of which the following is a specification, reference being had to the accompanying drawings.

My invention relates to the irrigation of trees, shrubs, and the like, and has for its object to provide a device by which water may be properly supplied to the roots and by which, also, fertilizer may be supplied efficiently.

A further object, as hereinabove suggested, is to provide for applying fertilizer more advantageously to the tree, which may be done in connection with the water supply.

A further object of my invention is to provide a device for the purpose stated which may be permanently placed in position and will not be injuriously affected by frost, and which will also prevent undue evaporation of the water supply; also to provide a construction which will not interfere with the mowing of the lawn in which it may be placed.

These objects I accomplish as illustrated in the drawings.

That which I believe to be new is set forth in the claims.

In the accompanying drawings, Figure 1 is a side elevation of my improved irrigator, showing its cap in place; Fig. 2 is a top or plan view thereof; Fig. 3 is a partial, central, vertical section; Fig. 4 is a horizontal section on line 4—4 of Fig. 3, the cover retaining-rod being removed; Fig. 5 is a perspective view of the cover retaining-rod; Fig. 6 is a detail, being a partial view of the locking-plate, the cover retaining-rod being in section; and Fig. 7 is a view illustrating the manner in which the irrigator is applied.

Referring to the drawings, 8 indicates a tube of corrugated sheet-iron open at its ends, which is adapted to be inserted in the earth adjacent to a tree or shrub, and extends down to a suitable depth, say, two feet or more, so as to extend below the dry stratum which ordinarily would be formed in the dry summer season. The length of the tube 8 depends somewhat on the place where it is to be put, but ordinarily a tube two feet long would meet all requirements.

The outside surface of the tube is preferably coated with asphaltum, or some other suitable preservative, and it may be galvanized to further protect it from rust. The object of making the tube corrugated is to prevent it from being damaged by freezing of any water that it may contain, since by its construction it is capable of expanding and contracting without damage, as conditions may require. When it is in position the upper end of the tube 8 projects slightly above the surface of the ground, as shown in Fig. 7, so that a cover may be applied thereto.

9 indicates the cover, which is preferably made of cast-iron and is circular, having a depending, marginal flange 10 which overlaps the upper end of the tube 8. By making the cover circular, it may be turned or rotated upon the tube to lock or unlock it, as hereinafter described.

11 indicates a locking-rod, which is secured centrally to the cover 9, preferably by being screwed into a suitable socket therein, and extends down into the tube 8 through a locking-plate 12 which is secured at its ends in the tube, as illustrated in Fig. 4, or in any other suitable way. The locking-plate 12 is provided with an elongated slot 13 for the passage of one or more webs 14 with which the locking-rod 11 is provided. The rod 11 is also provided with a head 15 at its lower end, said head being large enough so that it cannot pass through the opening in the plate 12. Preferably, the web or webs 14 are formed by making them integral with the rod 11, but they may be otherwise constructed. By this construction, by turning the cover 9 to a point where the web or webs 14 register with the slot 13, the cover 9 may be lifted to expose the tube 8 so that it may be easily filled with water, the webs 14 passing up through the slot 13. When the cover is lifted, at which time it assumes the position shown in Fig. 7, the lower ends of the web or webs 14 rest on the locking-plate 12, thereby supporting the cover in its elevated position. The cover cannot be separated from the tube after the latter has been put in place because the head 15 cannot pass through the opening in the locking-plate. When the tube 8 has been filled with water, the cover 9 may be replaced, and by giving it a partial turn it may be locked in position. By setting the tube 8 low enough, the cover 9 may be made practically flush with the surface of the ground so that it does not interfere with the passage of a lawnmower over it. The cover 9 serves not only to prevent evaporation of the water contained in the tube 8 but also to prevent sticks, stones and other refuse matter from falling into the tube, and keeps out ice and snow in the winter.

It will be apparent from the foregoing description that with my irrigating apparatus the water is supplied directly to the root system of the tree, and by dissolving fertilizer in the water, which may be done by introducing fertilizer into the tube 8, fertilizer may be efficiently applied. By the use of an apparatus of this kind a comparatively small quantity of water irrigates a tree very much more efficiently than a large volume of water applied to the surface. In practice, a hole is bored by a post-auger, or other suitable tool, the hole being somewhat deeper than the tube to be inserted in it so that space is provided in which a mass of stones or broken rock may be filled in. The tube is then set in the hole, resting on the stones, which facilitate the flow of water from the tube to the soil surrounding the roots of the tree. This not only permits the distribution of the water, but also increases the amount of water that may be supplied through the tube, and prevents water from standing in the tube. Ordinarily, the tube extends down between the larger roots and through the fibrous root mass so that the water introduced has ready access to the roots.

That which I claim as my invention, and desire to secure by Letters Patent, is,—

1. A tree irrigator, comprising a corrugated metal tube adapted to be inserted in the ground and having an opening at its upper end for the introduction of water thereinto, a circular cover fitted upon the upper end of said tube and adapted to turn axially thereon, and a locking-rod connected with the cover and operated thereby, said locking rod being adapted to limit the extent to which the cover may be moved away from said tube.

2. A tree irrigator, comprising a corrugated metal tube adapted to be inserted in the ground and having an opening at its upper end for the introduction of water thereinto, a circular cover fitted upon the upper end of said tube and adapted to turn axially thereon, a locking-rod connected with the cover and moved thereby, and a locking-plate secured in said tube and adapted to engage said locking-rod for limiting the movement thereof.

3. A tree irrigator, comprising a corrugated metal tube adapted to be inserted in the ground and having an opening at its upper end for the introduction of water thereinto, a circular cover fitted upon the upper end of said tube and adapted to turn axially thereon, a locking-rod connected with the cover, said locking-rod having one or more intermediate webs, and having a head at its lower end, and a locking-plate secured to the tube and having a slot for the passage of said webs.

4. A tree irrigator comprising a tube adapted to be inserted in the ground and having an opening at its upper end for the introduction of water thereinto, a circular cover fitted upon the upper end of said tube and adapted to turn axially thereon, and a locking rod connected with the cover and operated thereby, said locking rod being adapted to limit the extent to which the cover may be moved away from said tube.

EDWIN A. KANST.

Witnesses:
JOHN L. JACKSON,
MINNIE A. HUNTER.

Copies of this patent may be obtained for five cents each, by addressing the "Commissioner of Patents, Washington, D. C."